Jan. 12, 1926.　　　　　　　　　　　　　　　　　　1,569,465
J. L. DRAKE
SHEET GLASS APPARATUS
Filed April 30, 1925　　　2 Sheets-Sheet 2
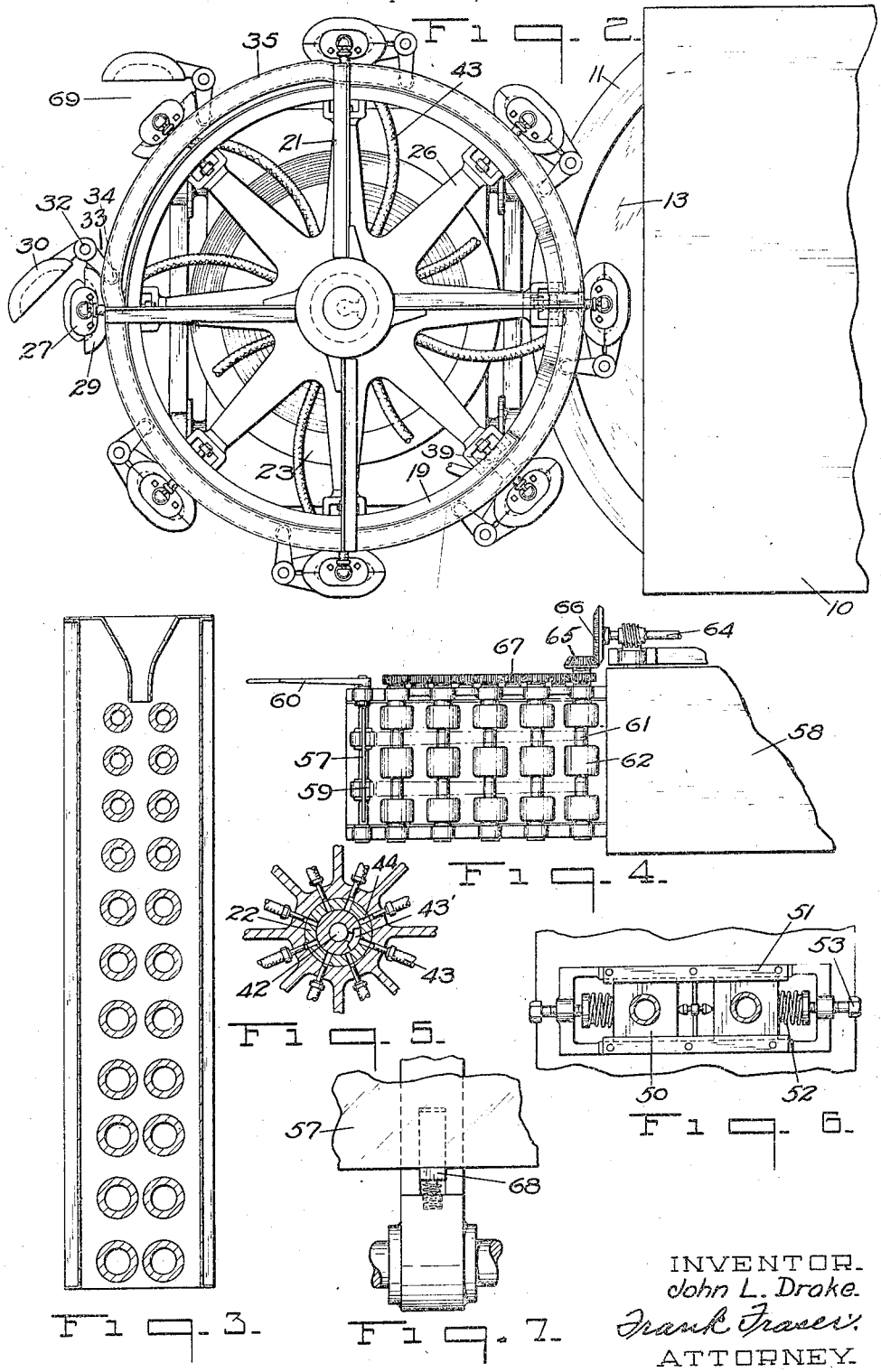
INVENTOR.
John L. Drake.
Frank Fraser.
ATTORNEY.

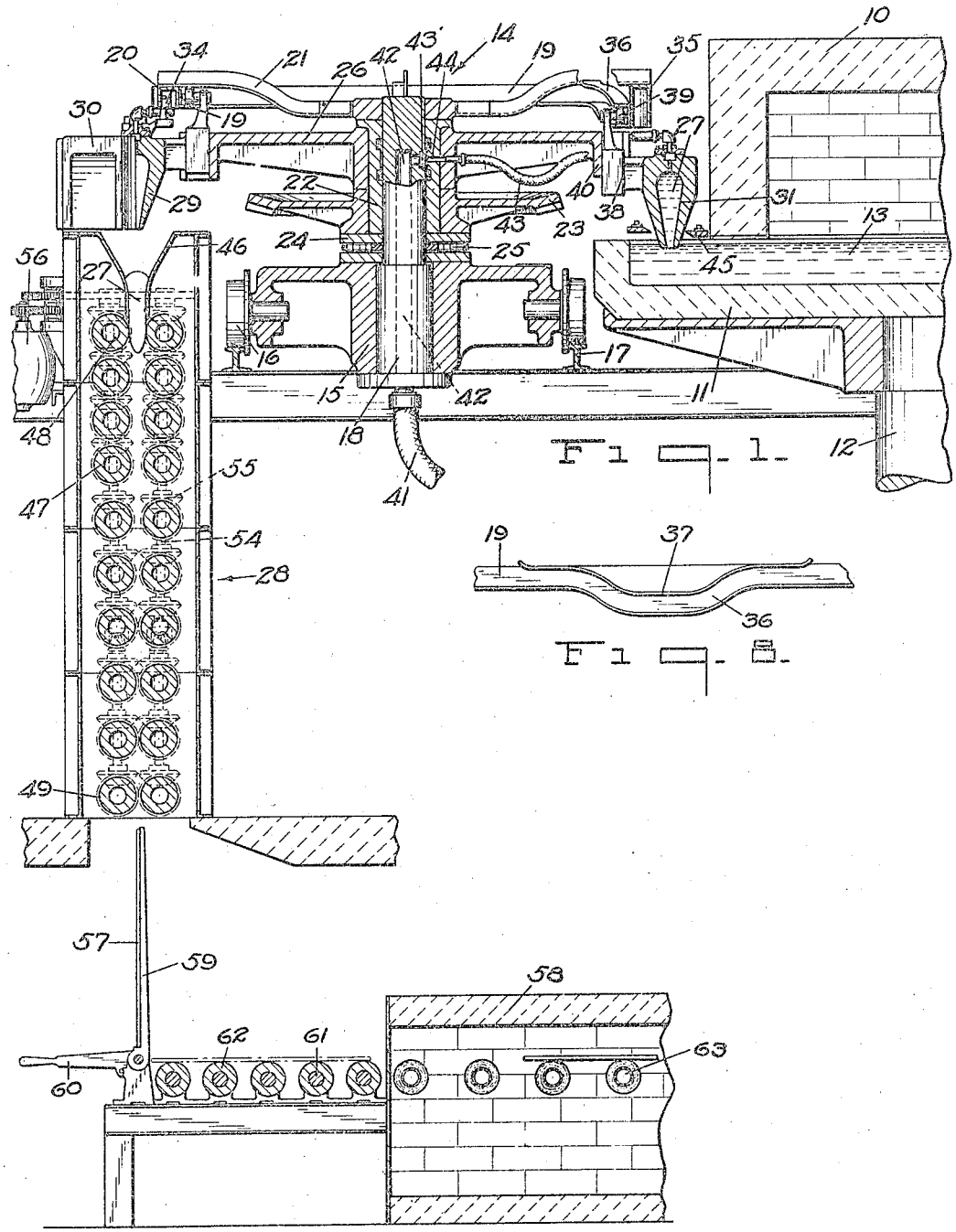

Patented Jan. 12, 1926.

1,569,465

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS APPARATUS.

Application filed April 30, 1925. Serial No. 26,944.

*To all whom it may concern:*

Be it known that I, JOHN L. DRAKE, a citizen of the United States, residing at Toledo, in the county of Lucas and State of Ohio, have invented new and useful Improvements in Sheet-Glass Apparatus, of which the following is a specification.

The present invention relates to sheet glass apparatus, and has particular reference to means for forming sheets of glass, especially well-adapted for use as plate glass blanks.

An important object of the invention is to provide an apparatus whereby plate glass blanks can easily and quickly be formed, the said blanks being exceptionally flat and having accurate predetermined dimensions.

Another object of the invention is to provide a process and apparatus for producing sheets of glass adapted for use in plate glass manufacture, the said blanks being formed by creating a gob of glass and permitting the gob of glass to be rolled through between a plurality of sets of polished rolls.

A further object is to provide a gob feeding apparatus to pick up and discharge successive gobs of glass of a predetermined size, and providing means adapted to quickly roll the gob into sheet form, the said sheet being reduced through successive stages to a sheet of predetermined dimensions.

Other objects and advantages of the invention will become apparent during the course of the following description.

In the drawings wherein like numerals are employed to designate like parts throughout the same, Fig. 1 is a fragmentary vertical longitudinal section through the apparatus, Fig. 2 is a top plan view of the gob feeding mechanism, Fig. 3 is a vertical sectional view through the gob reducing means or flattening mechanism, Fig. 4 is a top plan view of the sheet transferring mechanism, Fig. 5 is a sectional detail of a portion of the feeding mechanism, Fig. 6 is an end view of a roll mounting for a set of rolls, Fig. 7 is an elevation of a portion of the sheet transfer mechanism, and Fig. 8 is a fragmentary elevation of a portion of the gob feeding mechanism.

Plate glass blanks are ordinarily formed by rolling a large mass of glass upon a suitable table. This process of manufacture is quite expensive due to the necessary manual labor required, and also because of the amount of glass rolled out in this manner which is not usuable in plate glass manufacture. Molten glass discharged upon a table will set up and become viscous very rapidly and it is quite difficult to roll the mass of glass into a sheet blank of the desired thickness. Also because of the fact that the sheet is quite irregular by being formed in this manner, it is necessary to create a blank much thicker than the thickness of the finished sheet desired to allow for the removal of sufficient glass during the grinding and polishing operations to give a plate glass sheet which is absolutely uniform in thickness and flat throughout.

It is an aim of the present invention to provide process and apparatus for rapidly and easily forming sheets of glass adapted for use in plate glass manufacture. Because of the novel means employed it is possible to produce a blank substantially the same thickness as the thickness of the finished sheet desired as the blank thus formed is very flat and of a uniform thickness. In other words, it is only necessary to leave sufficient glass for removal during the grinding and polishing operations. In addition to the rapidity with which the sheet blanks can be formed, the operation is entirely automatic in so far as the discharging and rolling of the glass is concerned.

Broadly speaking, the apparatus consists of a tank containing a mass of molten glass, a gob feeding mechanism adapted to form a gob and to discharge it, and means associated with the discharge end of the gob feeding mechanism for rolling a gob into sheet form. A transfer mechanism is also provided to permit the sheet to be deflected from the vertical plane to a horizontal plane as it is ordinarily desirable to feed the gob of glass downwardly between sets of rolls. The sheet is then deflected so that it can be run through a horizontal annealing leer, although of course it could easily be run through a vertical leer if desired.

In Fig. 1 the numeral 10 designates a glass tank furnace which has connection with a pot 11. The pot 11 is preferably mounted upon a shaft 12 by which means it may be rotated for the purpose which will presently be pointed out. The mass of molten glass 13 is contained within the furnace 10 and pot 11. Arranged in proximity to the pot 11 is a gob feeding mechanism designated in its entirety by the numeral 14. The gob feeder comprises a base 15 supported upon the wheels 16 adapted to ride upon the trackway 17 whereby the gob feeding mechanism may be moved to and from an operative position. A central post or shaft 18 is carried by the base 15 and is adapted to carry at its upper end a double tracking mechanism 19 and 20 respectively, connected to the post by means of the spiders 21. The post and tracks are adapted to be held in a rigid position. A stationary bearing 22 is provided around which, at its lower end is rotatably mounted, a sun gear 23 which has connection with a drive pinion and source of power to rotate the same. A plate 24 and roller bearings 25 are provided to permit rotation of the sun gear 23 with the least possible friction and wear. A mold carriage 26 is also rotatable about the sleeve 22 and is moved with the gear 23. Although I have referred to the carriage 26 as a mold carriage, the molds so-called are not actually molds but are containers for carrying a gob or a charge of glass 27 from the pot 11 to the sheet forming mechanism 28. The molds comprise a stationary section 29 and a movable section 30, and form, when closed as shown in Fig. 1, a compartment 31 which is relatively larger at its inner end than at its outer end, whereby the charge of glass 27 can be introduced within the compartment and will remain therein with assistance with very little difficulty. The sections are pivoted by means of the pin 32, the movable section 30 being formed integral or being rigidly connected with the bell-crank 33 carrying at its outer end the wheel or roller 34. The roller 34 is adapted to run along the track 20 as shown in Fig. 1. The track 20 is provided with a cam portion 35 whereby the pivoted section 30 will be moved to an open position to permit the charge of glass 27 to be dropped therefrom. When the roll rides off the cammed portion 35, the roll sections will again be closed and ready to pick up another charge or gob of glass. The gob of glass is introduced within the mold by dipping the same down into a position as shown on the right-hand side of the gob feeding mechanism in Fig. 1, while a suction is created to draw up the charge of glass. The mold is then raised and carried around preferably to 180° where the charge is released and sent through the sheet forming mechanism 28. The dipping of molds is accomplished by forming the second track 19 as indicated in Fig. 8. The track 19 is provided with the dip or cammed portion 36 having the relatively flat low spot 37. The mold section 29 is carried on the arm 38 which is supported by means of the hanger and roll 39 riding on the trackway 19. A guide opening 40 is provided to prevent displacement of the roll during operation. As the molds are carried around the track and reach the cammed portion 36, they will be dipped down sufficiently far to permit the end of the mold to become submerged in the mass of molten glass 13, while at the same time suction is created through the connection 41, through the standard bore 42, and the hose connection 43 between the standard and the mold. Fig. 5 is a sectional detail showing the method of controlling the suction. The central post having the bore 42 is also provided with the slot 43'. As the openings 44 register with the slot 43, a vacuum will be created in the hose associated with that opening. Sufficient vacuum or suction is created within the mold to draw up a charge of glass. To make it possible to continuously draw up a charge of molten glass from the mass 13, the pot 11 is rotated so that each mold will be dipped down into a different part of the glass, thus preventing an excessive amount of heat absorption from the glass with subsequent devitrification. As the mold rises out of the pot by means of the cammed portion, cutter knives 45 are used to sever the gob from the glass within the pot 11. The charge 27 is then retained in the mold until it is above the troughed end 46 of the sheet forming mechanism 28 where the roller 34 will ride out upon the cammed track section 35, opening the mold and permitting the gob 28 to be discharged therefrom. The gob is permitted to run between the sets of rolls 47. The rolls 47 are arranged relatively far apart at the end 48 and relatively close together at the end 49. The rolls 49 determine the thickness of sheet formed, and are preferably mounted as indicated in Fig. 6 in adjustable journals 50 supported in the slideway 51, and normally urged toward each other by means of the safety springs 52. By adjusting the journals by means of the adjusting screws 53, the distance between the rolls 49 can be varied for the formation of various thicknesses of sheet blanks. The rolls are driven preferably at a high speed by means of the shafts 54 carrying bevel gears 55, meshing with similar gears carried by the roll shafts, the said shafts 54 deriving power from the means 56. The rolls are also preferably formed from a non-corrosive alloy and are provided with a highly polished surface especially at the lower end 49 where the final reduction of the gob 27 to sheet form is had. It will be seen that the gob 27 is reduced through successive stages to the desired dimensions very rapidly so that one gob after another can be discharged and sent through between the rolls, thereby facilitating rapid manufacture of blanks to be used in plate glass manufacture. A transfer mechanism is preferably used at the discharge end of the sheet forming mechanism 28, whereby the sheet 57 can be deflected from the vertical to the horizontal plane where it is run through an annealing leer 58 as will be understood. The transfer mechanism comprises the pivoted arms 59 which may be moved by means of the handle 60 or any form of operating mechanism. A conveyor, comprising a plurality of shafts 61 carrying the rolls 62, is provided, the said rolls 62 being spaced to permit the arms 59 to be swung downwardly and to allow the sheet to be supported upon the rolls 62 and transferred to the leer rolls 63. The shafts 61 may be rotated by tapping power from the leer drive shaft 64 by means of the bevel gears 65 and 66 respectively, the gear 66 driving one of the shafts 61 and carrying power through the others by means of the train of gears 67. A shock absorbing means 68 is provided to prevent fracture of the sheet when it strikes the transfer mechanism 59.

After the gob 27 has been discharged from the molds it is preferably held open as at 69 for a length of time sufficient to permit the mold sections to cool, after which the roll rides off the cammed track 35 and is ready to pick another gob. This operation is continued as one mold after another is dipped down within the glass and picks up a charge, after which it is rotated around and opened up to permit the gob to fall out and be passed through the sheet forming apparatus. Although but one sheet forming apparatus has been shown in combination with the gob feeding mechanism, obviously two or three, or in fact any number of such mechanism can be associated with the gob feeding mechanism, dependent upon the rapidity with which it is desired to manufacture the blanks. In addition, the gob feeding mechanism is so mounted that it can be easily moved away for repairs, etc., while another similar mechanism can be run into position and put into immediate use.

The size of sheet formed can be determined by the size of gob picked up from the glass 13. This can either be controlled by the length of time the mold is dipped in the glass, the suction created within the mold, or the size of mold.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a tank containing a mass of molten glass, means for picking up a charge of glass, and means for reducing the charge of glass through successive stages to sheet form.

2. In sheet glass apparatus, a tank containing a mass of molten glass, a plurality of sets of rolls, and means for picking up a gob of glass from the tank and discharging it in a manner to permit the gob to be run between the rolls to reduce it into sheet form.

3. In sheet glass apparatus, a tank containing a mass of molten glass, means for picking up a gob of glass, and means for changing the gob into sheet form.

4. In sheet glass apparatus, a tank containing a mass of molten glass, means for sucking up a gob of glass, and means for changing the gob into sheet form.

5. In sheet glass apparatus, a tank containing a mass of molten glass, means for sucking up a gob of the glass, and means for reducing the gob through successive stages to sheet form.

6. In sheet glass apparatus, a tank containing a mass of molten glass, means for sucking up a gob of the glass, and means for rolling the gob through successive stages to a sheet having predetermined dimensions.

7. In sheet glass apparatus, a tank containing a mass of molten glass, means for sucking up a predetermined sized gob of glass, and means for rolling the gob through successive stages to a sheet of predetermined size.

8. In sheet glass apparatus, a tank containing a mass of molten glass, gob feeding mechanism for sucking up gobs of glass, and means for rolling the gobs through successive stages to sheet form.

9. In sheet glass apparatus, a tank containing a mass of molten glass, a gob feeding mechanism in proximity thereto including means adapted to be dipped into the glass and to suck up a gob of glass, and means for reducing the gob to sheet form.

10. In sheet glass apparatus, a tank containing a mass of molten glass, a gob feeding mechanism in proximity thereto including means adapted to be dipped into the glass and to suck up a gob of glass, and means for rolling the gob through successive stages to sheet form.

11. In sheet glass apparatus, a tank containing a mass of molten glass, a gob feeding mechanism arranged in proximity thereto including a plurality of molds, means for successively dipping the molds into the glass, means to introduce a gob of glass into each mold as it is dipped, and means for reducing each gob to sheet form.

12. In sheet glass apparatus, a tank containing a mass of molten glass, a gob feeding mechanism arranged in proximity thereto including a plurality of molds, means for successively dipping the molds into the glass, means for sucking a quantity of glass into each mold as it is dipped, and means for reducing each quantity of glass into sheet form.

13. In sheet glass apparatus, a tank containing a mass of molten glass, a gob feeding mechanism arranged in proximity thereto, including a plurality of molds, means for successively dipping the molds into the glass, means for sucking a gob of glass into each mold as it is dipped, and means for reducing the gobs through successive stages to sheets of predetermined dimensions.

14. In sheet glass apparatus, a tank containing a mass of molten glass, a gob feeding mechanism arranged in proximity thereto including a plurality of sectional molds, means for successively dipping the molds when in closed position into the glass for picking up a gob of glass, means opening the molds to release the gob, and means for reducing the gob to sheet form.

15. The process of producing sheet glass, consisting in picking up a gob of glass and then reducing it to sheet form.

16. The process of producing sheet glass, consisting in sucking up a gob of glass and then reducing it to sheet form.

17. The process of producing sheet glass, consisting in sucking up a gob of glass and then reducing it through successive stages to sheet form.

18. The process of producing sheet glass, consisting in sucking up a predetermined sized charge of glass and then reducing it to sheet form.

Signed at Toledo, in the county of Lucas, and State of Ohio, this 28th day of April, 1925.

JOHN L. DRAKE.